(12) United States Patent
Miyashita et al.

(10) Patent No.: US 9,698,634 B2
(45) Date of Patent: Jul. 4, 2017

(54) STATOR CORE AND PERMANENT MAGNET MOTOR

(71) Applicant: SANYO DENKI CO., LTD., Tokyo (JP)

(72) Inventors: Toshihito Miyashita, Tokyo (JP); Manabu Horiuchi, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 159 days.

(21) Appl. No.: 14/617,405

(22) Filed: Feb. 9, 2015

(65) Prior Publication Data

US 2015/0229166 A1  Aug. 13, 2015

(30) Foreign Application Priority Data

Feb. 10, 2014  (JP) ................ 2014-023622

(51) Int. Cl.
 *H02K 1/16* (2006.01)
 *H02K 1/14* (2006.01)
(52) U.S. Cl.
 CPC ............ *H02K 1/148* (2013.01); *H02K 1/141* (2013.01); *H02K 1/146* (2013.01)
(58) Field of Classification Search
 CPC ......... H02K 1/146; H02K 1/148; H02K 1/141
 See application file for complete search history.

(56) References Cited

U.S. PATENT DOCUMENTS

| 7,528,519 B2* | 5/2009 | Miyashita ............ 310/216 |
| 2004/0183393 A1 | 9/2004 | Suzuki |
| 2007/0063610 A1 | 3/2007 | Miyashita |

FOREIGN PATENT DOCUMENTS

| JP | 6162537 | 4/1986 |
| JP | 2003088078 A2 | 3/2003 |
| JP | 2004304997 A2 | 10/2004 |
| JP | 2005080474 A2 | 3/2005 |
| JP | 2007089271 | 4/2007 |
| JP | 4476202 | 6/2010 |

* cited by examiner

*Primary Examiner* — Dang Le
(74) *Attorney, Agent, or Firm* — Rankin, Hill & Clark LLP

(57) ABSTRACT

A stator core includes a first core sheet having a plurality of teeth that is radially protruded outward and a teeth coupling portion that couples the plurality of teeth, and at least two kinds of second core sheets having a plurality of teeth that is radially protruded outward and slot openings that are provided between the plurality of teeth. The first and second core sheets are laminated to form a stack structure, and, in the second core sheets of an identical kind, the slot openings are identical in opening angle and are evenly distributed in a circumferential direction.

8 Claims, 3 Drawing Sheets

STATOR CORE AND PERMANENT MAGNET MOTOR

CROSS-REFERENCE TO RELATED APPLICATION

This application claims priority from Japanese Patent Application No. 2014-023622 filed with the Japan Patent Office on Feb. 10, 2014, the entire content of which is hereby incorporated by reference.

BACKGROUND

1. Technical Field

The present disclosure relates to a stator core and a permanent magnet motor.

2. Description of the Related Art

A permanent magnet motor generates torque with pulsation in no-load driving. The pulsation of the torque is called coming toque. The cogging torque inhibits smooth rotation of a rotor, resulting in vibration and speed fluctuation of the motor. Therefore, the reduction of cogging torque is important in design of a permanent magnet motor.

Conventionally, in a stator core used for reducing cogging torque of a permanent magnet motor, teeth coupling portions are entirely closed and are not provided with slot openings.

However, when the teeth coupling portions closing the slots are made thick, cogging torque becomes low but torque also decreases.

There has been disclosed a stator core as a technique for reducing cogging torque (see JP-A-2005-80474). The core sheets laminated in the stator core include portions where teeth ire coupled together and portions where the teeth are not coupled, and portions for coupling the teeth are made thinned.

In addition, there has been disclosed a stator having a plurality of laminated core sheets in which teeth coupling portions are made thin and different in angle (see JP-A-2004-304997).

Further, there has been disclosed a stator core having a plurality of laminated core sheets with at least two kinds of teeth tip angles (see JP-A-2003-88078). According to the technique disclosed in JP-A-2003-88078, cogging torque can be reduced.

There has also been disclosed a stator core having laminated core sheets with coupled teeth and core sheets with non-coupled teeth (see JP-Y-61-62537). According to the technique disclosed in JP-Y-61-62537, it is possible to reduce occurrence of short-circuit of magnetic flux produced by a permanent magnet at the teeth coupling portions, thereby suppressing reduction of torque.

Furthermore, there has been disclosed a stator core having three kinds of core sheets laminated in combination such that the teeth coupling portions and the slot openings are alternately arranged in one of the sheets (see Japanese Patent No. 4476202).

SUMMARY

A stator core includes a first core sheet having a plurality of teeth that is radially protruded outward and a teeth coupling portion that couples the plurality of teeth, and at least two kinds of second core sheets having a plurality of teeth that is radially protruded outward and slot openings that are provided between the plurality of teeth. The first and second core sheets are laminated to form a stack structure, and, in the second core sheets of an identical kind, the slot openings are identical in opening angle and are evenly distributed in a circumferential direction.

DESCRIPTION OF THE EMBODIMENTS

Figure 1:
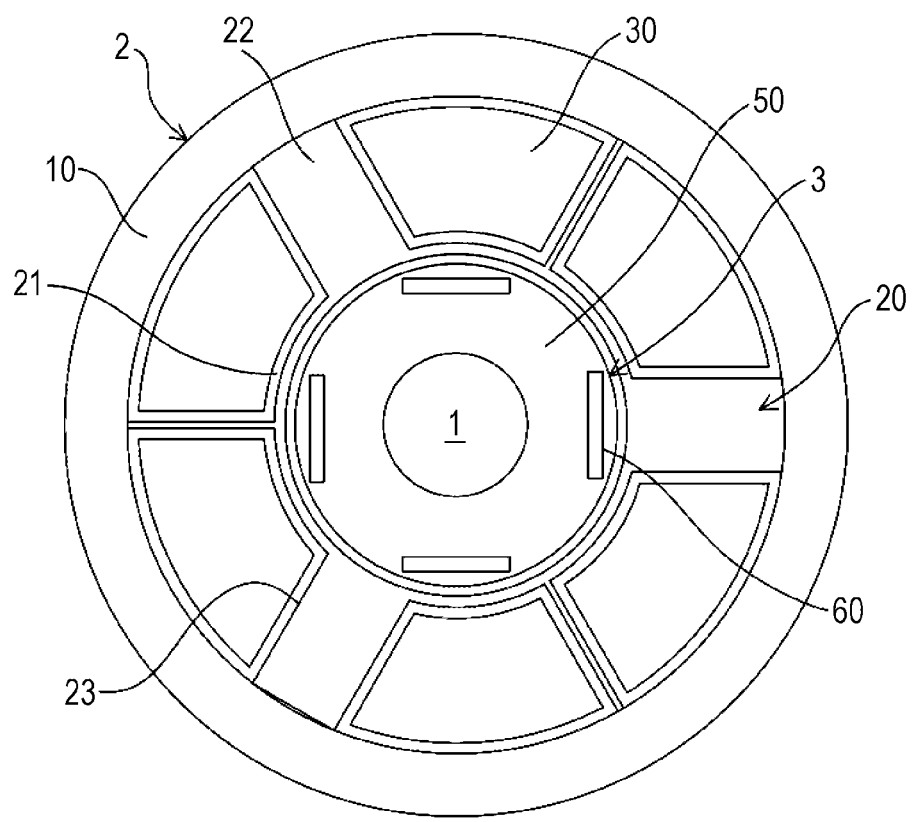
FIG. 1 is a schematic view of an entire configuration of a permanent magnet motor according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the techniques disclosed in JP-A-2005-80474 and JP-A-2004-304997, the teeth coupling portions are made thin. However, when the teeth coupling portions are made thin, torque becomes high but cogging torque also increases.

According to the technique disclosed in JP-A-2003-88078, the stator core includes the two kinds of core sheets. It is difficult to adjust cogging torque and torque using the two kinds of core sheets.

According to the technique disclosed in JP-Y-61-62537, the stator core is provided by laminating the core sheets having coupled teeth and the core sheets with non-coupled teeth. However, as with the technique disclosed in JP-A-2003-88078, it is difficult to adjust cogging torque and torque using the two kinds of core sheets.

According to the technique disclosed in Japanese Patent No. 447620, the three kinds of core sheets are laminated such that the teeth coupling portions and the slot openings are alternately arranged in one of the sheets. However, this technique is difficult to use when the number of the teeth is odd.

An object of the present disclosure is to provide a stator core that allows low cogging torque and high torque, and a permanent magnet motor provided with the stator core.

A stator core according to an embodiment of the present disclosure includes a first core sheet having a plurality of teeth that is radially protruded outward and a teeth coupling portion that couples the plurality of teeth, and at least two kinds of second core sheets having a plurality of teeth that is radially protruded outward and slot openings that are provided between the plurality of teeth. The first and second core sheets are laminated to form a stack structure, and, in the second core sheets of an identical kind, the slot openings are identical in opening angle and are evenly distributed in a circumferential direction.

In the second core sheets of different kinds, the slot openings may be different in opening angle from each other.

A permanent magnet motor according to an embodiment of the present disclosure includes: the stator core as described above; a stator having a plurality of coils; and a rotor that is stored in the stator to be spaced from the stator, fixed to a circumference of a shaft, and has a plurality of permanent magnets.

In the stator core, the core sheets form a stack structure. In at least one kind of first core sheets, the teeth are coupled together via the teeth coupling portions. The first core sheets have no slot openings. In at least two kinds of second core sheets, the teeth are not coupled. The second core sheets have slot openings.

In the second core sheets of the same kind, the slot openings are identical or substantially identical in opening angle, and are evenly or almost evenly distributed in a circumferential direction.

That is, at least one kind of first core sheets have no slot openings, and at least two kinds of second core sheets have slot openings. Therefore, according to the stator core, low cogging torque and high torque can be provided.

A stator core and a permanent magnet motor according to an embodiment will be described below with reference to the accompanying drawings.

The stator core and the permanent magnet motor according to the embodiment have a stack structure including at least one kind of core sheets without slot openings and at least two kinds of core sheets with slot openings. In a plurality of core sheets of the same kind with slot openings, the slot openings are identical or substantially identical in opening angle, and are evenly or almost evenly distributed in a circumferential direction.

Therefore, according to the embodiment, it is possible to provide a stator core and a permanent magnet motor that allow low cogging torque and high torque.

[Configurations of Stator Core and Permanent Magnet Motor]

Figure 2:
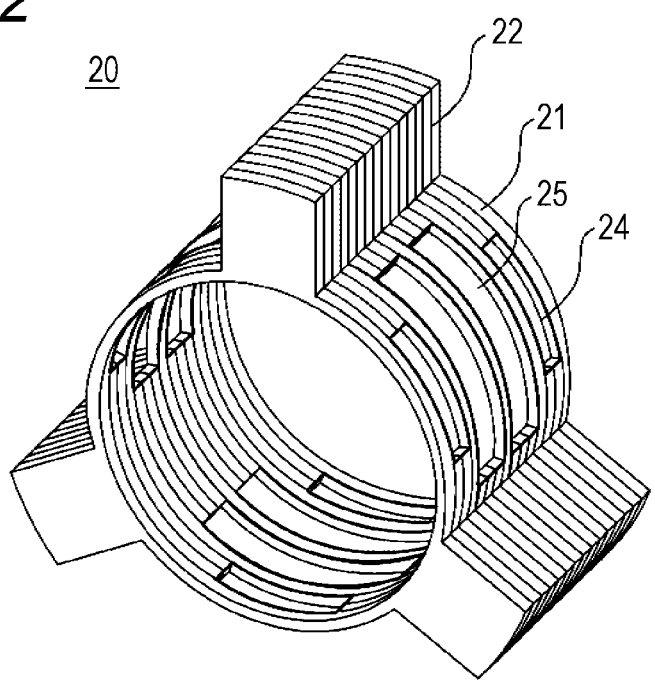
FIG. 2 is a perspective view of an entire appearance of a stator core according to the embodiment.
Figure 3:
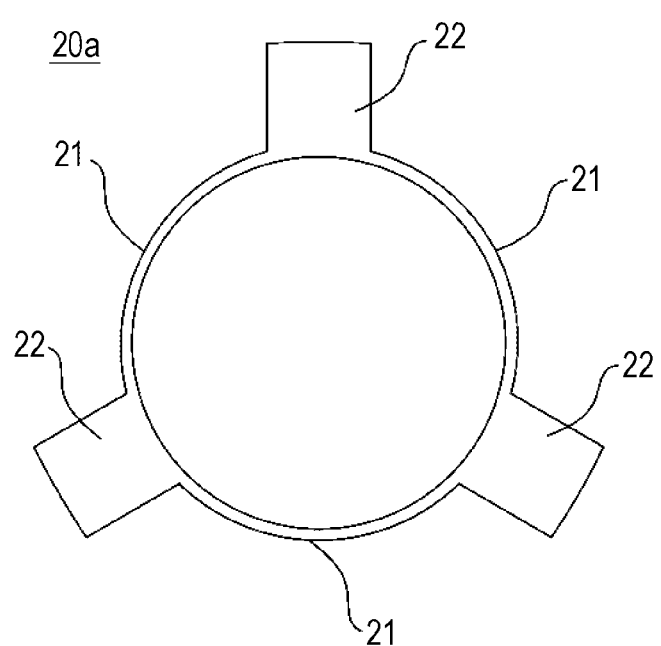
FIG. 3 is a front view of a first core sheet in the stator core according to the embodiment.
Figure 4:
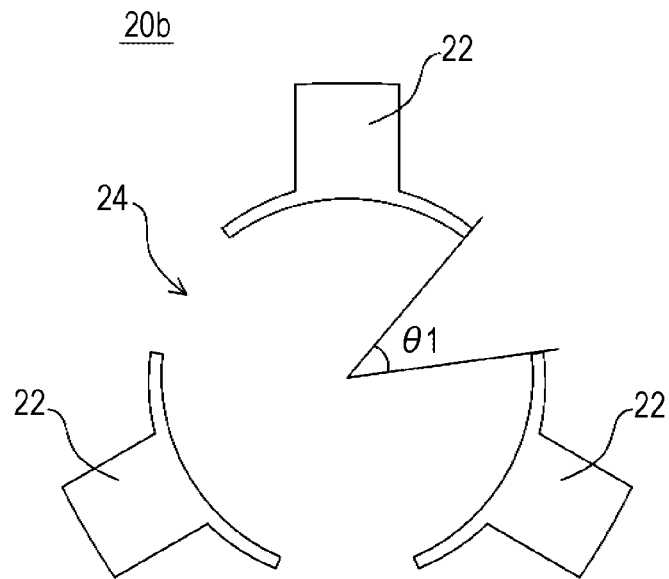
FIG. 4 is a front view of a second core sheet in the stator core according to the embodiment.
Figure 5:
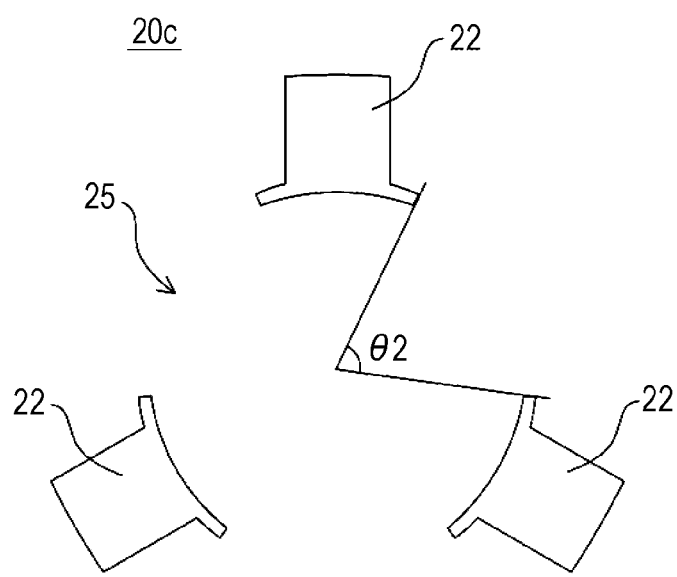
FIG. 5 is a front view of another second core sheet in the stator core according to the embodiment.

First, referring to FIGS. 1 to 5, configurations of the stator core and the permanent magnet motor according to the embodiment will be described. FIG. 1 is a schematic view of an entire configuration of the permanent motor according to the embodiment. FIG. 2 is a perspective view of an entire appearance of the stator core according to the embodiment. FIG. 3 is a front view of a first core sheet in the stator core according to the embodiment. FIG. 4 is a front view of a second core sheet in the stator core according to the embodiment. FIG. 5 is a front view of another second core sheet in the stator core according to the embodiment.

The permanent magnet motor according to the embodiment (hereinafter simply referred to as "motor") may be an AC servo motor, for example.

As illustrated in FIG. 1, a motor 100 includes a stator 2 and a rotor 3 in a bracket (not illustrated). The rotor 3 includes a shaft 1.

In the bracket, a columnar space is defined to accommodate the stator 2 and the rotor 3. A through hole for insertion of the shaft 1 is formed at both ends of the bracket.

The material for the bracket may be a soft magnetic body such as a silicon steel plate or an aluminum alloy. However, the material for the bracket is not limited thereto.

The stator 2 is fixed to an inner periphery of the bracket. The stator 2 has a yoke 10, a stator core 20, and coils 30.

The yoke 10 is a cylindrical metal member provided along the inner periphery of the bracket. The yoke 10 has the function of closing a magnetic line of force and maximizing the action of electromagnetic induction. The yoke 10 also has the function of preventing or suppressing the impact on peripheral devices of the motor 100 by a magnetic field resulting from electromagnetic induction.

The material for the yoke 10 may be a soft magnetic body such as a silicon steel plate, for example. However, the material for the yoke 10 is not limited thereto.

The stator core 20 is a metal member and has a substantially deformed cylindrical shape as a whole. The stator core 20 has a plurality of teeth 22. The teeth 22 are radially protruded outward from outer peripheries of annular teeth coupling portions 21 of the stator core 20. A plurality of slots 23 is defined and formed as spaces for accommodating the coils 30 between the teeth 22 and 22.

The stator core 20 has the annular teeth coupling portions 21 at the center, as illustrated in FIG. 2. The plurality of teeth 22 is radially protruded outward from the outer peripheries of the teeth coupling portions 21.

The stator core 20 is formed as a stator core stack having a lamination of three or more kinds of deformed core sheets, for example. The stator core 20 according to the embodiment includes three kinds of deformed core sheets 20a, 20b, and 20c. However, the stator core 20 is not limited thereto and may include any three or more kinds of deformed core sheets.

Among them, as illustrated in FIGS. 2 and 3, the teeth 22 are coupled together via the teeth coupling portions 21 in at least one kind of core sheets 20a (first core sheets). In the core sheet 20a of the embodiment, the teeth 22 are coupled at three positions via the teeth coupling portions 21. Therefore, the core sheets 20a have no slot openings.

On the other hand, as illustrated in FIGS. 2, 4, and 5, at least two kinds of core sheets 20b and 20c (second core sheets) do not have the teeth coupling portions 21. Accordingly, the teeth 22 are not coupled to each other in the core sheets 20b and 20c. Therefore, the core sheets 20b and 20c have slot openings 24 and 25, respectively.

All of the core sheets 20a, 20b, and 20c are laminated with the teeth 22 aligned with one another to form a stack structure. It is preferred that the core sheets 20a with the teeth coupling portions 21 are arranged at least at both ends of the stator core 20 in the direction of thickness.

As illustrated in FIG. 2, a plurality of core sheets 20b may be arranged (laminated) on the core sheet 20a at the both ends to form relatively small and substantially rectangular openings in the stator core 20. The relatively small and substantially rectangular openings may be formed by a plurality of adjacent slot openings 24. In addition, the core sheet 20a may be arranged (laminated) on the core sheets 20b. Further, a plurality of core sheets 20c may be arranged (laminated) on the core sheet 20a to form relatively large and substantially rectangular openings in the stator core 20. The relatively large and substantially rectangular openings may be formed by a plurality of adjacent slot openings 25. The core sheet 20a (the teeth coupling portions 21 of the core sheet 20a) may be arranged (laminated) between the almost rectangular openings to avoid the openings from being adjacent to each other.

In the plurality of core sheets 20b (20c) of the same kind without the teeth coupling portions 21, the slot openings 24 (25) are identical or substantially identical in opening angle and are evenly or almost evenly distributed in the circumferential direction. Specifically, in the plurality of core sheets 20b without the teeth coupling portions 21, the slot openings 24 are identical or substantially identical in opening angle and are evenly or almost evenly distributed in the circumferential direction. Similarly, in the plurality of core sheets 20c without the teeth coupling portions 21, the slot openings 25 are identical or substantially identical in opening angle and are evenly or almost evenly distributed in the circumferential direction.

In addition, as illustrated in FIGS. 4 and 5, in the two kinds of core sheets 20b and 20c without the teeth coupling portions 21, the opening angles θ1 and θ2 of the slot openings 24 and 25 are different from each other depending on the kind. Specifically, the opening angle θ1 of the slot openings 24 in the core sheet 20b without the teeth coupling portions 21 is different from the opening angle θ2 of the slot openings 25 in the core sheet 20c without the teeth coupling portions 21.

In the embodiment, the opening angle θ1 of the slot openings 24 in the core sheet 20b and the opening angle θ2 of the slot openings 25 in the core sheet 20c are set to be in the relationship θ1<θ2.

The material for the core sheets 20a, 20b, and 20c may be a soft magnetic body such as a silicon steel plate as well as the material for the yoke 10, for example. However, the material for the core sheets 20a, 20b, and 20c is not limited thereto.

The coils 30 of the embodiment are resin-molded coils with an air core portion (not illustrated) and are arc-shaped in cross section. The teeth 22 of the stator core 20 are inserted and arranged in the air core portions of the coils (molded coils) 30.

The number of the slots 23 corresponds to the number of the coils (molded coils) 30. In this embodiment, the stator 2 has three slots and three coils. However, the numbers of the slots 23 and the coils 30 in the stator 2 are not limited to the numbers described in this embodiment.

The coils 30 in the stator core 20 are fitted into the yoke 10.

Returning to FIG. 1, the rotor 3 has a rotor core 50 and permanent magnets 60. The rotor 3 is stored in the stator 2 to be spaced from the stator 2, and is fixed to the circumference of the shaft 1. The shaft 1 is rotatably borne by a bearing supported at the both ends of the bracket. The shaft 1 constitutes the center of rotation of the rotor 3.

The rotor core 50 is a thick cylindrical metal member provided around the shaft. 1. The rotor core 50 may be formed as a rotor core stack having a plurality of laminated core sheets or may be formed as a single thick cylindrical metal member, for example.

The material for the rotor core 50 may be a soft magnetic body such as a silicon steel plate, for example. However, the material for the rotor core 50 is not limited thereto.

A plurality of permanent magnets 60 is incorporated into a surface or an inside of the rotor core 50. The plurality of permanent magnets 60 is evenly or almost evenly arranged in the circumferential direction of the rotor core 50. The plurality of permanent magnets 60 has a magnetization arrangement in which N and S poles are alternately arranged in the circumferential direction of the rotor core 50, for example. However, the magnetization arrangement of the permanent magnets 60 is not thereto.

The permanent magnets 60 may be rare-earth magnets such as neodymium magnets, for example. However, the material for the permanent magnets 60 is not limited thereto.

[Operations of Stator and Permanent Magnet Motor]

Next, referring to FIGS. 1 to 5, operations of the stator and the motor according to the embodiment will be described.

As illustrated in FIG. 1, the motor 100 according to the embodiment includes the rotor 3 and the stator 2 in the bracket.

In the rotor 3, the plurality of permanent magnets 60 is incorporated into a surface or an inside of the rotor core 50. The plurality of permanent magnets 60 is arranged such that N and S poles are alternately placed in the circumferential direction.

Meanwhile, the stator 2 surrounds the rotor 3 and has a plurality of coils 30 aligned in the circumferential direction.

That is, in the motor 100 according to the embodiment, electric current flows through the coils 30 of the stator 2 in the direction that intersects with magnetic flux produced by the permanent magnets 60 of the rotor 3. In the motor 100, when the magnetic flux of the permanent magnets 60 and the electric current flowing through the coil 30 intersect with each other, a driving force is generated at the coils 30 in the circumferential direction by the action of electromagnetic induction, and then the rotor 3 rotates around the shaft 1.

In the stator 2 and the motor 100 according to the embodiment, the stator core 20 includes three or more kinds of core sheets. The stator core 20 of the embodiment has a stack structure with three kinds of laminated core sheets 20a, 20b, and 20c.

Among them, in at least one kind of core sheets 20a, the teeth 22 are coupled together via the teeth coupling portions 21. Meanwhile, at least two kinds of core sheets 20b and 20c do not have the teeth coupling portions 21. In the two kinds of core sheets 20b and 20c, the teeth 22 are not coupled with each other.

Therefore, at least one kind of core sheets 20a with the teeth coupling portions 21 have no slot openings. Meanwhile, at least two kinds of core sheets 20b and 20c without the teeth coupling portions 21 have the slot openings 24 and 25.

In the plurality of core sheets 20b (20c) of the same kind without the teeth coupling portions 21, the slot openings 24 (25) are identical or substantially identical in opening angle and are evenly or almost evenly distributed in the circumferential direction. Specifically, in the plurality of core sheets 20b without the teeth coupling portions 21, the slot openings 24 are identical or substantially identical in opening angle and are evenly or almost evenly distributed in the circumferential direction. Similarly, in the plurality of core sheets 20c without the teeth coupling portions 21, the slot openings 25 are identical or substantially identical in opening angle and are evenly or almost evenly distributed in the circumferential direction.

In addition, as illustrated in FIGS. 4 and 5, in the two kinds of core sheets 20b and 20c without the teeth coupling portions 21, the opening angles θ1 and θ2 of the slot openings 24 and 25 are different from each other depending on the kind. Specifically, the opening angle θ1 of the slot openings 24 in the core sheet 20b without the teeth coupling portions 21 is different from the opening angle θ2 of the slot openings 25 in the core sheet 20c without the teeth coupling portions 21.

In the embodiment, the opening angle θ1 of the slot openings 24 in the core sheet 20b and the opening angle θ2 of the slot openings 25 in the core sheet 20c are set in the relationship θ1<θ2. That is, the slot openings 24 in the core sheet 20b and the slot openings 25 in the core sheet 20c are different in opening length.

Therefore, according to the stator 2 and the motor 100 in the embodiment, at least one kind of core sheets 20a have no slot openings and at least two kinds of core sheets 20b and 20c have the slot openings 24 and 25 of different lengths. Therefore, according to the embodiment, it is possible to provide the stator core 20 and the motor 100 that allows low cogging torque and high torque.

A preferred embodiment of the present disclosure is described above. However, the foregoing description is intended only for illustration of the present disclosure, and is not intended to limit the technical scope of the present disclosure to the foregoing embodiment. The technique of the present disclosure can be carried out in various modes different from the foregoing embodiment without deviating from the gist of the present disclosure.

The stator core including permanent magnets has a stack structure with a lamination of a plurality of deformed core sheets, for example.

In the stator core and the permanent magnet motor according to the embodiment, at least one kind of core sheets without slot openings and at least two kinds of core sheets with slot openings may form as stack structure. In the at least two kinds of core sheets with slot openings, the core sheets of the same kind may be configured such that the slot openings are identical in opening angle and are evenly distributed in the circumferential direction.

In the core sheets 20b and 20c without the teeth coupling portions 21, the core sheets 20b or 20c of the same kind may be configured such that the slot openings 24 or 25 are identical in opening angle and are evenly distributed in the circumferential direction.

In the core sheets 20b and 20c without the teeth coupling portions 21, the opening angles θ1 and θ2 of the slots openings 24 and 25 may be different from each other depending on the kind of the sheets.

The permanent magnets 60 may have a magnetization arrangement such that N and S poles are alternately arranged in the circumferential direction of the rotor core 50, for example. The plurality of permanent magnets 60 may be magnetized such that N and S poles are alternately arranged in the circumferential direction.

The stator core and the permanent magnet motor according to one embodiment of the present disclosure may be first and second stator cores and a first permanent magnet motor as described below.

The first stator core is a stator core having a plurality of teeth that is radially protruded outward from an outer periphery of an annular teeth coupling portion, including: at least one kind of core sheets that have the teeth coupled together via the teeth coupling portion and have no slot openings; and at least two kinds of core sheets that have the teeth not coupled and have the slot openings, wherein all of the core sheets are laminated to form as stack structure, and in the core sheets without the teeth coupling portion, the core sheets of the same kind have the slot openings that are identical in opening angle and are evenly distributed in as circumferential direction.

The second stator core is configured such that, in the first stator core, the core sheets of different kinds without the teeth coupling portion have the slot openings that are different in opening angle from each other depending on the kind.

The first permanent magnet motor includes a first or second stator core, a stator with a plurality of coils, and a rotor that is stored in the stator with a space therefrom, fixed to a circumference of a shaft, and has a plurality of permanent magnets.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A stator core, comprising:
   a first core sheet having a plurality of teeth that is radially protruded outward and a teeth coupling portion that couples the plurality of teeth; and
   at least two kinds of second core sheets having a plurality of teeth that is radially protruded outward and a plurality of slot openings that are provided between the plurality of teeth, wherein
   the first and second core sheets are laminated to form a stack structure,
   in each of the at least two kinds of the second core sheets, the second core sheet has a single angle of the plurality of slot openings and the plurality of slot openings are evenly distributed in a circumferential direction, and
   the single angle of the plurality of the slot openings in one of the at least two kinds of the second core sheets is different from the single angle of the plurality of the slot openings in another of the at least two kinds of the second core sheets.

2. A permanent magnet motor, comprising:
   the stator core according to claim 1;
   a stator having a plurality of coils; and
   a rotor that is stored in the stator to be spaced from the stator, fixed to a circumference of a shaft, and has a plurality of permanent magnets.

3. The stator core according to claim 1, wherein the single angle of the plurality of the slot openings in one of the at least two kinds of the second core sheets is smaller than the single angle of the plurality of the slot openings in another of the at least two kinds of the second core sheet.

4. The stator core according to claim 1, wherein the plurality of the slot openings in one of the at least two kinds of the second core sheet and the plurality of the slot openings in another of the at least two kinds of the second core sheet are different from each other in opening length.

5. The stator core according to claim 1, wherein the stator core consists of:
   the first core sheet having the plurality of teeth that is radially protruded outward and the teeth coupling portion that couples the plurality of teeth; and
   the at least two kinds of second core sheets having the plurality of teeth that is radially protruded outward and the plurality of slot openings that are provided between the plurality of teeth.

6. The stator core according to claim 1, wherein the first core sheet has no slot openings.

7. A stator core comprising a plurality of core sheets, the plurality of core sheets consisting of:
   a first core sheet having a plurality of teeth that is radially protruded outward and a teeth coupling portion that couples the plurality of teeth, the first core sheet having no slot openings; and
   at least two kinds of second core sheets having a plurality of teeth that is radially protruded outward and a plurality of slot openings that are provided between the plurality of teeth, wherein
   the first and second core sheets are laminated to form a stack structure, and
   in each of the at least two kinds of the second core sheets, the second core sheet has a single angle of the plurality of slot openings and the plurality of slot openings are evenly distributed in a circumferential direction.

8. A plurality of stacked core sheets for a stator core, the plurality of stacked core sheets consisting of:

a first core sheet having a plurality of teeth that is radially protruded outward and a teeth coupling portion that couples the plurality of teeth, the first core sheet having no slot openings; and at least two kinds of second core sheets having a plurality of teeth that is radially protruded outward and a plurality of slot openings that are provided between the plurality of teeth, wherein the first and second core sheets are laminated to form a stack structure, and in each of the at least two kinds of the second core sheets, the second core sheet has a single angle of the plurality of slot openings and the plurality of slot openings are evenly distributed in a circumferential direction.

\* \* \* \* \*